US009739376B2

(12) United States Patent
Horie et al.

(10) Patent No.: US 9,739,376 B2
(45) Date of Patent: Aug. 22, 2017

(54) CYLINDER HEAD

(71) Applicants: Nobuhiko Horie, Toyota (JP); Yukari Araki, Chiryu (JP); Tatsuo Shitara, Okazaki (JP)

(72) Inventors: Nobuhiko Horie, Toyota (JP); Yukari Araki, Chiryu (JP); Tatsuo Shitara, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 392 days.

(21) Appl. No.: 14/426,064

(22) PCT Filed: Dec. 3, 2013

(86) PCT No.: PCT/IB2013/003019
§ 371 (c)(1),
(2) Date: Mar. 4, 2015

(87) PCT Pub. No.: WO2014/087239
PCT Pub. Date: Jun. 12, 2014

(65) Prior Publication Data
US 2015/0226328 A1    Aug. 13, 2015

(30) Foreign Application Priority Data
Dec. 7, 2012   (JP) .................. 2012-267812

(51) Int. Cl.
*F16J 10/00*    (2006.01)
*F16J 10/02*    (2006.01)
(Continued)

(52) U.S. Cl.
CPC .............. *F16J 10/02* (2013.01); *F01M 11/02* (2013.01); *F02F 1/38* (2013.01); *F01M 2011/023* (2013.01); *F02F 1/243* (2013.01)

(58) Field of Classification Search
CPC .................. F16J 10/02; F01M 11/02
(Continued)

(56) References Cited

U.S. PATENT DOCUMENTS 5,253,615 A * 10/1993 Heater .................... F02B 75/22
123/195 R
6,513,506 B1 * 2/2003 Ito .......................... F02F 1/243
123/193.5

FOREIGN PATENT DOCUMENTS

JP    2004-324503 A    11/2004
JP    2009-47001 A      3/2009
(Continued)

OTHER PUBLICATIONS

International Search Report issued Mar. 21, 2014 in PCT/IB2013/003019.

*Primary Examiner* — Michael Leslie
*Assistant Examiner* — Daniel Collins
(74) *Attorney, Agent, or Firm* — Oblon, McClelland, Maier & Neustadt, L.L.P.

(57) ABSTRACT

A cylinder head includes a plurality of exhaust ports provided corresponding to a plurality of cylinders, and configured to converge outlets of the exhaust ports inside the cylinder head, at least one of the exhaust ports not being provided with a water jacket there above, and a pair of oil passages arranged so as to sandwich the at least one of the exhaust ports above which the water jacket is not provided. An inclined surface provided on an upper surface of the cylinder head and positioned between the pair of oil passages, the inclined surface being inclined from one oil passage, of the pair of oil passages, toward the other oil passage.

6 Claims, 5 Drawing Sheets (51) Int. Cl.
*F02F 1/38* (2006.01)
*F01M 11/02* (2006.01)
*F02F 1/24* (2006.01)

(58) Field of Classification Search
USPC ........................................................ 92/169.1
See application file for complete search history.

(56) References Cited

FOREIGN PATENT DOCUMENTS

JP  2011-202578 A  10/2011
JP  2012-202266 A  10/2012

\* cited by examiner

CYLINDER HEAD

BACKGROUND OF THE INVENTION

1. Field of the Invention

The invention relates to a cylinder head, and more particularly, to a cylinder head configured such that outlets of exhaust ports corresponding to a plurality of cylinders converge inside the cylinder head.

2. Description of Related Art

A cylinder head configured such that outlets of exhaust ports corresponding to a plurality of cylinders converge inside the cylinder head is known (see Japanese Patent Application Publication No. 2011-202578 (JP 2011-202578 A), for example).

JP 2011-202578 A describes a water jacket structure of a cylinder head provided with a plurality of cylinders, exhaust ports corresponding to the plurality of cylinders, and a water jacket provided near the exhaust ports.

In this cylinder head, the surface area of the exhaust, ports is increased by having the exhaust ports converge inside the cylinder head. As a result, heat exchange is promoted between exhaust gas that flows through the exhaust ports inside the cylinder head, and coolant that flows through the water jacket, which reduces the temperature of the exhaust gas (i.e., cools the exhaust gas).

Also, reducing the temperature of the exhaust gas in the exhaust ports reduces the heat load on a catalyst provided downstream of the exhaust ports, in an operating state in which the heat quantity of the exhaust gas increases, such as when the engine is under a high load or operating at a high speed.

With the cylinder head described in JP 2011-202578 A, having the exhaust ports converge inside the cylinder head results in the length of exhaust passages of the exhaust ports that extend from the cylinders positioned on the outside in a direction in which the cylinders are arranged (hereinafter, simply referred to as "cylinder arrangement direction"), becoming longer than the length of the exhaust passages of the exhaust ports that extend from the cylinders positioned on the inside in the cylinder arrangement direction. Therefore, the surface area of the exhaust ports with the longer exhaust passages that are positioned on the outside is larger than the surface area of the exhaust ports with the shorter exhaust passages that are positioned on the inside.

As a result, the temperature of the exhaust gas that flows through the exhaust ports with the longer exhaust passages that are positioned on the outside will be lower than the temperature of the exhaust gas that flows through the exhaust ports with the shorter exhaust passages that are positioned on the inside. Accordingly, a difference in the temperatures of the exhaust gas in the exhaust ports among cylinders increases. One conceivable way to eliminate this temperature difference is to reduce (i.e., not provide) a water jacket that is normally provided near the exhaust ports with the longer exhaust passages.

However, with this method, it is possible that the cooling effect on the engine oil that runs down inside the cylinder head may decrease by an amount corresponding to the reduction in the water jacket. That is, it may be difficult to reduce the temperature of the engine oil.

SUMMARY OF THE INVENTION

The invention thus provides a cylinder head in which outlets of exhaust ports converge, that enables the temperature of engine oil to be reduced.

A first aspect of the invention relates to a cylinder head that includes a plurality of exhaust ports provided corresponding to a plurality of cylinders, and configured to converge outlets of the exhaust ports inside the cylinder head, at least one of the exhaust ports not being provided with a water jacket there above, and a pair of oil passages arranged so as to sandwich the at least one of the exhaust ports above which the water jacket is not provided. An inclined surface provided on an upper surface of the cylinder head and positioned between the pair of oil passages, the inclined surface being inclined from one oil passage, of the pair of oil passages, toward the other oil passage.

According to this structure, the upper surface of the cylinder head is positioned between the pair of oil passages. The upper surface is inclined from one oil passage, of the pair of oil passages, toward the other oil passage. Therefore, oil that has dripped down onto the upper surface (i.e., the inclined surface) of the cylinder head will run down from the one oil passage toward the other oil passage along this inclined surface. Consequently, the period of time (time) during which the engine oil contacts the upper surface (i.e., the inclined surface) of the cylinder head is able to be longer than it is when the upper surface of the cylinder head is not inclined. As a result, the temperature of the engine oil is able to be reduced by an amount corresponding to the increase in the period of time (time) during which the engine oil contacts the upper surface (i.e., the inclined surface) of the cylinder head.

In the cylinder head described above, one oil passage, of the pair of oil passages, may be positioned on an inside, in a cylinder arrangement direction, of the cylinder head, and the other oil passage, of the pair of oil passages, may be positioned on an outside in the cylinder arrangement direction. Also, the inclined surface of the cylinder head may be positioned between the pair of oil passages, and be inclined such that oil flows from the oil passage positioned on the inside toward the oil passage positioned on the outside.

In the cylinder head described above, one oil passage, of the pair of oil passages, is positioned on an inside, in a cylinder arrangement direction, of the cylinder head; and the other oil passage, of the pair of oil passages, is positioned on an outside in the cylinder arrangement direction, and the inclined surface of the cylinder head is positioned between the pair of oil passages, the inclined surface corresponding to the oil passage positioned on the inside is in a position higher than a position of the inclined surface corresponding to the oil passage positioned on the outside.

According to the structures, the period of time (time) during which the engine oil contacts the inclined surface of the cylinder head is longer. Therefore, more oil is able to flow through the oil passage positioned on the outside that also tends to be cooled by outside air, while the temperature of the engine oil is reduced.

In the cylinder head described above, a length of the oil passage, of the pair of oil passages, positioned on the outside in the cylinder arrangement direction may be shorter than a length of the oil passage positioned on the inside in the cylinder arrangement direction.

According to this structure, because the depth is less, the oil that flows into the oil passage positioned on the outside flows down that much more easily compared with the oil passage positioned on the inside. Therefore, the oil is able to flow smoothly.

In the cylinder head described above, the inclined surface of the cylinder head may be positioned between the pair of oil passages and the inclined surface may be inclined in an axial direction of the oil passages.

According to this structure, the oil that drips down in the axial direction of the pair of oil passages is able to flow more easily toward the oil passage along the upper surface (inclined surface) of the cylinder head.

In the cylinder head described above, of the exhaust ports corresponding to the plurality of cylinders, a length of the exhaust port provided on an outside in a cylinder arrangement direction may be made longer than a length of the exhaust port provided on an inside in the cylinder arrangement direction, and the at least one of the exhaust ports above which the water jacket is not provided may be an exhaust port provided on the outside in the cylinder arrangement direction.

According to this structure, when the water jacket is provided above the exhaust port that is provided on the outside, the temperature difference increases by an amount corresponding to the amount by which the surface area of the exhaust port on the outside is larger than the surface area of the exhaust port on the inside, because the temperature of exhaust gas that flows through the exhaust port on the outside tends to be lower than the temperature of exhaust gas that flows through the exhaust port provided on the outside. In contrast, when the head-side water jacket is not provided above the exhaust port that is provided on the outside, the temperature difference between the temperature of exhaust gas that flows through the exhaust port on the outside and temperature of exhaust gas that flows through the exhaust port on the inside is able to be reduced.

As described above, the cylinder head of the invention enables the temperature of engine oil to be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the cylinder head according to the invention will be described with reference to the accompanying drawings.

Figure 1:
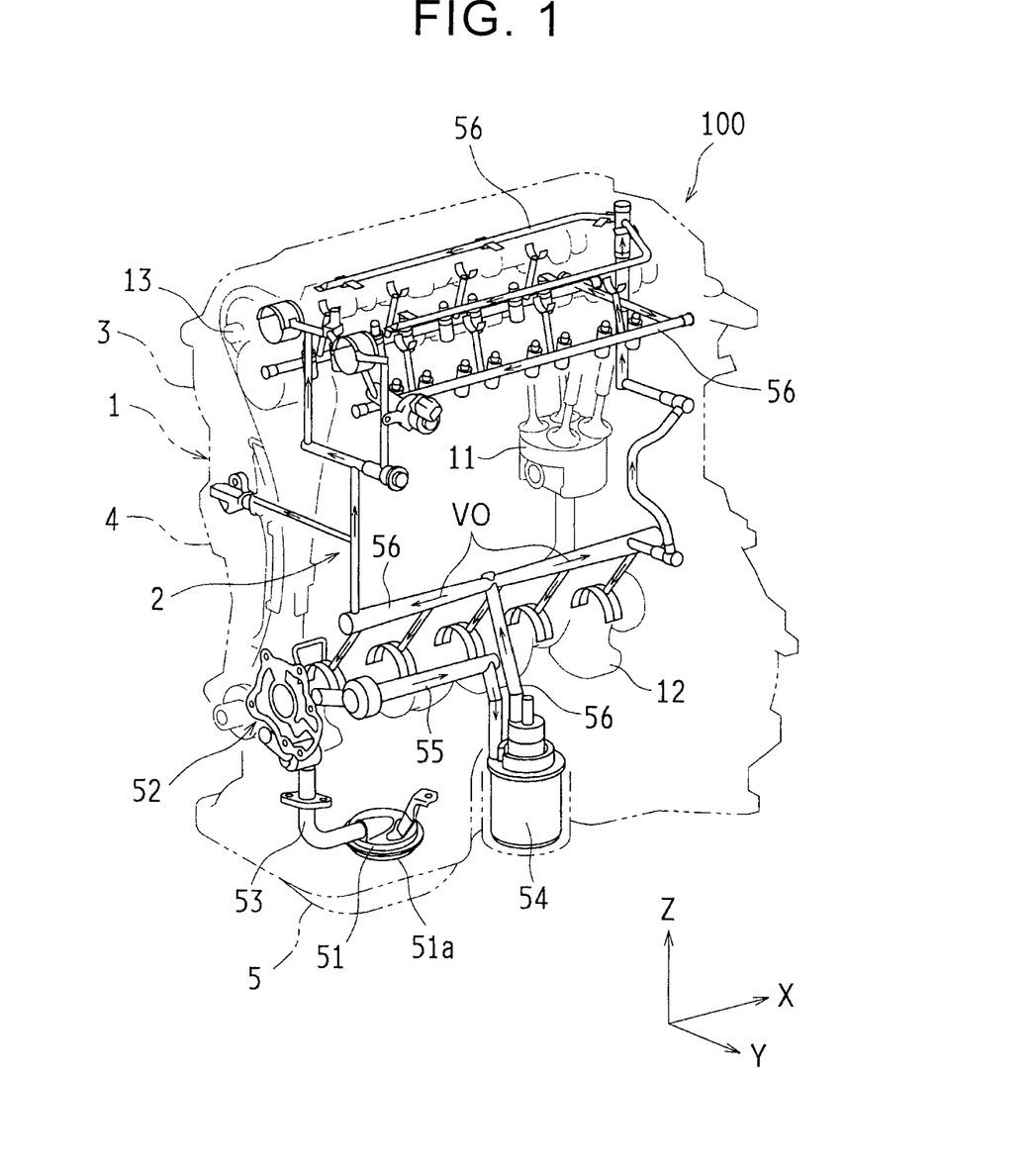
FIG. 1 is a block diagram of an example of an oil circulation system in an engine according to one example embodiment of the invention.

An oil circulation system of an in-line four cylinder engine according to one example embodiment will be described with reference to FIG. 1. An engine 100 includes an engine block 1 in which a mechanism to be lubricated (hereinafter, simply referred to as "lubricated mechanism") is arranged, and a lubrication system 2 that circulates oil inside the engine 100 to lubricate the lubricated mechanism.

The engine block 1 includes a cylinder head 3 and a cylinder block 4. Various lubricated members such as pistons 11, a crankshaft 12, and a camshaft 13, are arranged in the cylinder head 3 and the cylinder block 4. An oil pan 5 that is a member that stores oil to be supplied to these lubricated members is arranged in a lower end portion of the engine block 1.

The lubrication system 2 is configured as described below to enable oil stored inside the oil pan 5 to be supplied to the various lubricated members.

An oil strainer 51 is arranged inside the oil pan 5. The oil strainer 51 removes foreign matter and the like from the oil. The oil strainer 51 has an inlet port 51a that draws in oil stored in the oil pan 5, and is connected via a strainer flow path 53 to an oil pump 52 provided on the engine block 1.

The oil pump 52 is a pump that draws up oil stored in the oil pan 5, and supplies it (i.e., the oil) as lubricating oil to the lubricated members via an oil filter 54. The oil pump 52 is configured as a rotary pump or the like, for example. Also, a rotor of the oil pump 52 is engaged with the crankshaft 12 so that it (i.e., the rotor) rotates when the crankshaft 12 rotates.

Also, the oil pump 52 is connected via an oil delivery line 55 to an oil inlet of the oil filter 54 provided on an outer portion of the engine block 1. An oil outlet of the oil filter 54 is connected to an oil supply line 56 provided as an oil flow path that leads to the various lubricated members.

When the engine 100 starts to be operated, the oil pump 52 is driven when the crankshaft 12 rotates. Then the oil pump 52 draws in oil stored in the oil pan 5 from the inlet port 51a of the oil strainer 51, as indicated by arrows VO.

The oil that has been drawn in is then supplied to the lubricated members that are to be lubricated inside the engine block 1, via the oil delivery line 55, the oil filter 54, and the oil supply line 56, in this order. The oil supplied to the lubricated members in this way functions as lubricating oil at the lubricated members, and after absorbing heat such as friction heat generated when the lubricating members operate, the oil drips down by gravity and is recovered in the oil pan 5.

Next, the structure of the cylinder head 3 will be described. The cylinder head 3 is assembled onto an upper portion of the cylinder block 4, thereby closing off an upper end of four cylinders 41a, 41b, 41c, and 41d (see FIGS. 3 and 4) formed by this cylinder block 4, and consequently forming combustion chambers between the cylinder head 3 and pistons 11 that have been inserted into the cylinders 41a to 41d.

Figure 3:
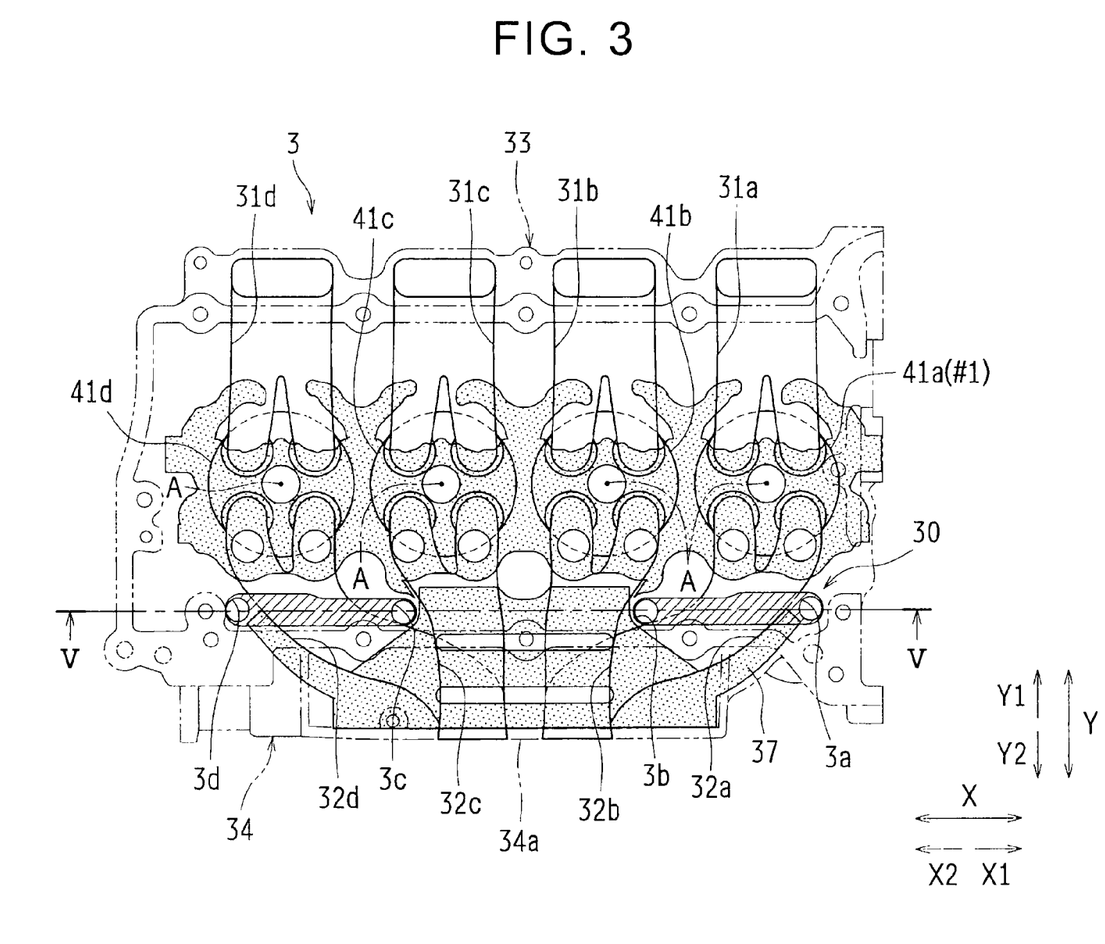
FIG. 3 is an explanatory view of the overall layout of cylinders, exhaust ports, and a water jacket and the like, when seen through cylinder head from above, according to the invention.

As an example, in the engine 100 in this example embodiment, the four cylinders 41a to 41d are lined up in a row, as shown transparently from above in FIG. 3. Hereinafter, these four cylinders 41a to 41d will be referred to as first cylinder 41a (#1), second cylinder 41b (#2), third cylinder 41c (#3), and fourth cylinder 41d (#4), in order from one end in a longitudinal direction of the cylinder head 3 (i.e., in direction X that is the cylinder arrangement direction) toward the other end (i.e., from the cylinder on the side in the direction of arrow X1 toward the cylinder on the side in the direction of arrow X2).

A shallow depressions that will become ceiling portions of the combustion chambers of the cylinders 41a to 41d are formed in a lower surface of the cylinder head 3. Intake ports 31a, 31b, 31c, and 31d, and exhaust ports 32a, 32b, 32c, and 32d are open in these depressions.

Figure 2:
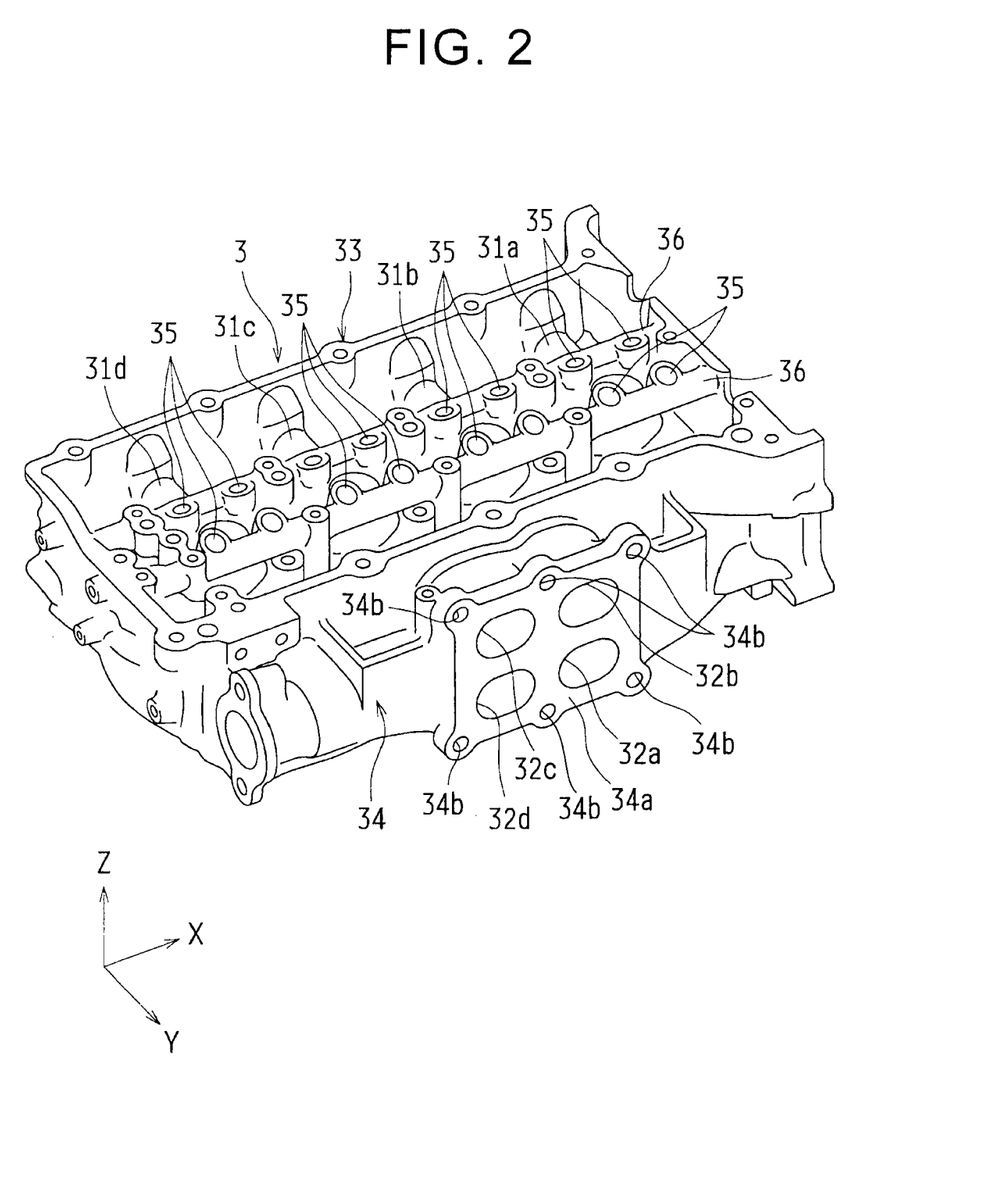
FIG. 2 is a perspective view of a cylinder head according to the example embodiment, as viewed from above at an angle on an exhaust side.

That is, in FIG. 2, the four intake ports 31a to 31d for introducing air into the combustion chambers in the cylinders 41a to 41d, as also shown in FIG. 3, are open in a side wall 33 on an intake side of the cylinder head 3 that is the far side in the drawing, and are configured to be connected to an intake manifold, not shown.

On the other hand, in FIG. 2, the four exhaust ports 32a to 32d for discharging burned gas from the combustion chambers in the cylinders 41a to 41d, as also shown in FIG. 3, are open in a side wall 34 on an exhaust side of the cylinder head 3 that is the near side in the drawing, and are configured to be connected to an exhaust manifold, not shown.

Also, the cylinder head 3 has a structure in which a portion of the exhaust manifold is integrated with the side wall 34 on the exhaust side. As will be described in detail later, the four exhaust ports 32a to 32d that are longer than usual are formed on the side wall 34 on the exhaust side. As shown in FIG. 2, a generally rectangular-shaped fastening seat portion 34a is formed in substantially the center, in the longitudinal direction, of the side wall 34 on the exhaust side, and the four exhaust ports 32a to 32d are open two by two in the upper and lower left right portions of the fastening seat portion 34a.

That is, when a direction of a side of the cylinder head that faces the cylinder block is a downward direction (i.e., the minus direction of a Z axis in FIG. 2, i.e., direction Z2 in FIG. 5), the two outside exhaust ports 32a and 32d are open adjacent one another in the cylinder arrangement direction, in a lower half portion of the fastening seat portion 34a. When a direction opposite the side of the cylinder head that faces the cylinder block is an upward direction (i.e., the plus direction of the Z axis in FIG. 2, i.e., direction Z1 in FIG. 5), the two inside exhaust ports 32b and 32c are open adjacent one another in the cylinder arrangement direction, in an upper half portion of the fastening seat portion 34a. Also, a bolt hole 34b is open in each of four corners of the fastening seat portion 34a, and the center of both an upper edge and a lower edge. A flange of the exhaust manifold, not shown, is overlapped with the fastening seat portion 34a and fastened thereto.

Although not shown, a DOHC type valve system provided with a camshaft is arranged, on both the intake side and the exhaust side, on an upper portion of the cylinder head 3. Also, reference character 35 denotes Hydraulic Lash Adjuster (HLA) housing holes provided two by two on both the intake side and the exhaust side for each of the cylinders 41a to 41d (see FIG. 3). Reference character 36 denotes a passage forming portion that supplies oil to the HLAs on both the intake side and the exhaust side.

As shown in FIG. 3, when the cylinder head 3 is viewed transparent from above, the upstream end, in the direction of exhaust gas flow, of each of the four exhaust ports 32a to 32d that correspond to the cylinders branches off into two, which are individually communicated with the inside of the corresponding cylinder 41a to 41d. On the other hand, midstream and downstream portions of the exhaust ports 32a to 32d do not branch off.

Also, the midstream and downstream portions of the exhaust ports 32a to 32d extend into the side wall 34 on the exhaust side, without converging with the adjacent exhaust ports 32a to 32d. Also, the outlets of the exhaust ports 32a to 32d are individually open on the fastening seat portion 34a as described above. That is, the adjacent exhaust ports 32a to 32d do, not merge into a single port, but instead the outlets of the exhaust ports 32a to 32d converge at a single location while being remaining separate.

Also, of the four exhaust ports 32a to 32d, the exhaust ports 32a and 32d on the outsides (i.e., the outside passages) that are communicated with the first cylinder 41a and the fourth cylinder 41d, respectively, that are both on the outside in the cylinder arrangement direction gradually curve from the upstream side toward the downstream side, in the direction of exhaust gas flow, so as to approach the center in the cylinder arrangement direction, when viewed from a vertical direction (the direction of cylinder center lines A, i.e., the axial direction of the cylinders). In other words, the exhaust ports 32a and 32d on the outsides are curved with a relatively large curvature radius, so as to approach the inside in the cylinder arrangement direction.

More specifically, the exhaust ports 32a and 32d on the outsides curve toward the inside in the cylinder arrangement direction, near an outer periphery of the first cylinder 41a and the fourth cylinder 41d, respectively, and extend to near the center in the cylinder arrangement direction, then curve off midway in the opposite direction, and then extend to near the fastening seat portion 34a adjacent to each other.

On the other hand, the exhaust ports 32b and 32c on the inside (i.e., the inside passages) that are communicated with the second cylinder 41b and the third cylinder 41c, respectively, that are positioned on the inside in the cylinder arrangement direction extend in a substantially straight line from the second and third cylinders 41b and 41c toward the fastening seat portion 34a of the side wall 34 on the exhaust side when viewed from above.

Therefore, the exhaust ports 32b and 32c on the inside tend to be shorter than the exhaust ports 32a and 32d on the outsides, which greatly curve in the cylinder arrangement direction as described above. In other words, the exhaust ports 32a and 32d on the outsides, which greatly curve in the cylinder arrangement direction, tend to be longer than the exhaust ports 32b and 32c on the inside.

Also, a head-side water jacket 37 is provided in the cylinder head 3, from the cylinders 41a to 41d to the exhaust ports 32a to 32d when viewed from above. This head-side water jacket 37 reduces the gas temperature (the temperature of the exhaust gas) (i.e., cools the exhaust gas) discharged from the exhaust ports 32a to 32d and the area around the combustion chambers.

Figure 5:
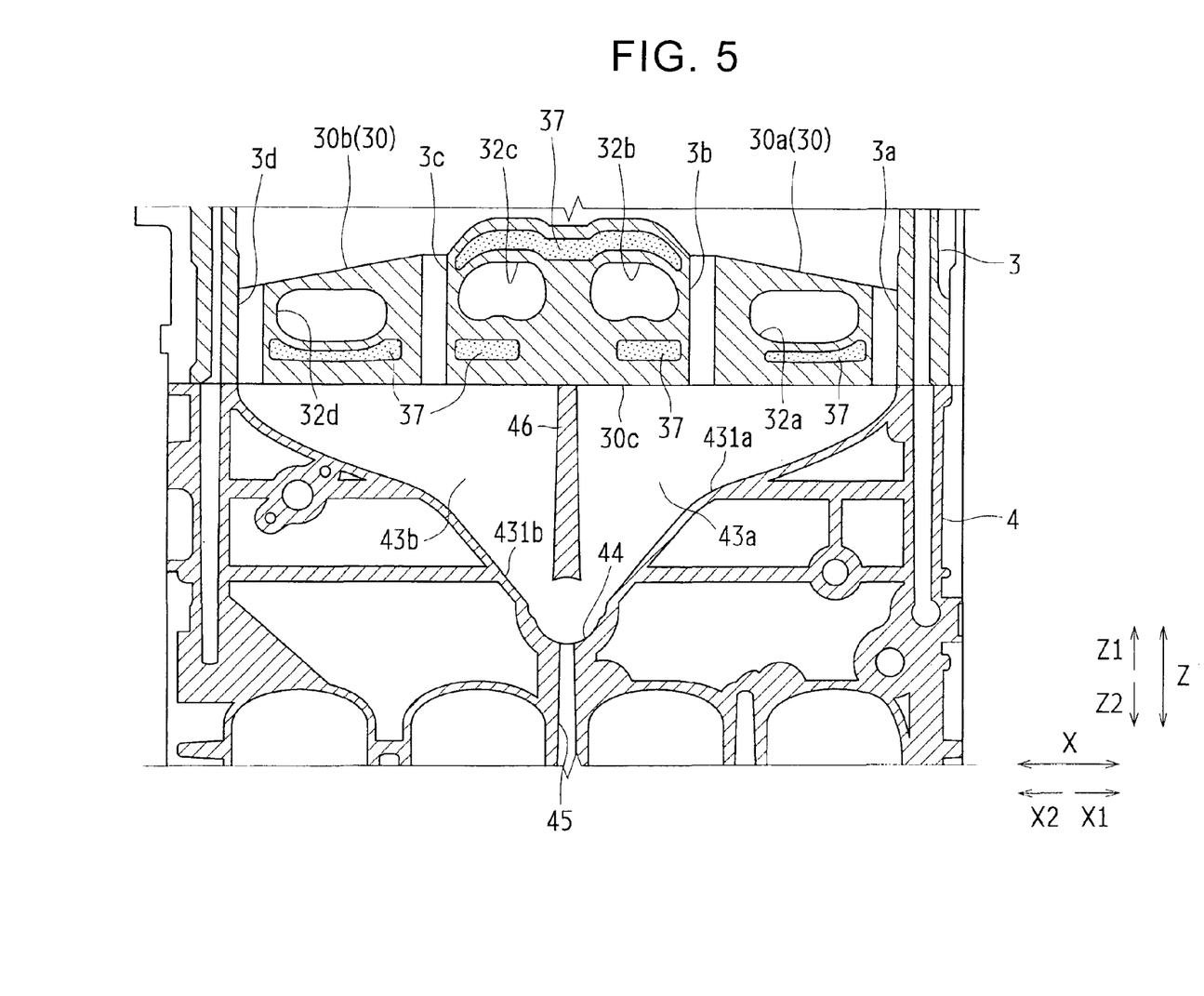
FIG. 5 is a sectional view of the cylinder head and the cylinder block taken along line V-V in FIG. 3.

Here, in this example embodiment, the head-side water jacket 37 is not provided above (i.e., in the direction of arrow Z1) the exhaust ports 32a and 32d on the outsides, as shown in FIG. 5, on the side wall 34 on the exhaust side of the head-side water jacket 37.

In other words, the head-side water jacket 37 is provided inside the cylinder head 3 so as to avoid the area above the exhaust ports 32a and 32d on the outsides. Further, the head-side water jacket 37 is provided above (i.e., on the side in the direction of arrow Z1) the exhaust ports 32b and 32c on the inside. Also, the head-side water jacket 37 is provided below (i.e., on the side in the direction of arrow Z2) the exhaust ports 32a and 32d on the outsides and the exhaust ports 32b and 32c on the inside.

Also, as shown in FIG. 3, four oil passages 3a, 3b, 3c, and 3d through which oil that has lubricated the lubricated mechanism drips down to the cylinder block 4 side (i.e., downward), are provided in an upper surface 30 of the cylinder head 3. These four oil passages 3a, 3b, 3c, and 3d are generally circular cylindrical-shaped holes that extend along in the axial direction of the cylinders (direction Z; see FIG. 5). Also, the areas of the four oil passages 3a to 3d through which the oil passes are substantially equal.

The oil passage 3a is provided on the outside (i.e., the side in the direction of arrow X1), in the cylinder arrangement direction, with respect to the exhaust port 32a that is on the outside, in the upper surface 30 of the cylinder head 3. The oil passage 3b is provided on the inside (i.e., the side in the direction of arrow X2), in the cylinder arrangement direction, with respect to the exhaust port 32a. The oil passage 3c is provided on the inside (i.e., the side in the direction of arrow X1), in the cylinder arrangement direction, with respect to the exhaust port 32d that is on the outside. The oil passage 3d is provided on the outside (i.e., the side in the direction of arrow X2), in the cylinder arrangement direction, with respect to the exhaust port 32d that is on the outside.

Further, as shown in FIG. 5, an inclined surface 30a (an inclined portion) that is inclined in, a linear fashion from the inside toward the outside in the cylinder arrangement direction, is formed on a portion of the upper surface 30 of the cylinder head 3, which is positioned between the oil passage 3a and the oil passage 3b, and above the exhaust port 32a that is on the outside.

This inclined surface 30a is inclined with respect to an axial direction of the oil passages 3a and 3b, and a lower surface 30c of the cylinder head 3. Also, an outside portion of the inclined surface 30a (i.e., a portion of the inclined surface 30a that is on the side in the direction of arrow X1) is positioned lower than an inside portion of the inclined surface 30a (i.e., a portion of the inclined surface 30a that is on the side in the direction of arrow X2). That is, the oil passage 3a is provided at the lowest point by partially lowering the height of the upper surface 30. Also, a depth of the oil passage 3a in the axial direction of the cylinders is less (i.e., shallower) than the depth of the oil passage 3b.

Accordingly, when the oil that has lubricated the lubricated mechanism drips down onto the inclined surface 30a, it (i.e., the oil) will run along in the direction in which the inclined surface 30a is inclined, and fall onto the cylinder block 4 from the oil passage 3a. That is, the amount of oil that falls onto the cylinder block 4 from the oil passage 3a will be greater than the amount of oil that falls onto the cylinder block 4 from the oil passage 3b. As a result, the heat exchange time from the oil on the inclined surface 30a of the cylinder head 3 is able to be increased, so the oil temperature is able to be reduced.

Similarly, an inclined surface 30b (an inclined portion) that is inclined in a linear fashion from the inside toward the outside in the cylinder arrangement direction, is formed on a portion of the upper surface 30 of the cylinder head 3, which is positioned between the oil passage 3c and the oil passage 3d, and above the exhaust port 32d that is on the outside.

This inclined surface 30b is inclined with respect to an axial direction of the oil passages 3c and 3d, and a lower surface 30c of the cylinder head 3. Also, an outside portion of the inclined surface 30b (i.e., a portion of the inclined surface 30b that is on the side in the direction of arrow X2) is lower than an inside portion of the inclined surface 30b (i.e., a portion of the inclined surface 30b that is on the side in the direction of arrow X1). That is, the oil passage 3d is provided at the lowest point by partially lowering the height of the upper surface 30. Also, a depth of the oil passage 3d in the axial direction of the cylinders is less (i.e., shallower) than the depth of the oil passage 3c. That is, the length of the oil passage 3d in the axial direction of the cylinders is shorter than the length of the oil passage 3c.

Accordingly, when the oil that has lubricated the lubricated mechanism drips down onto the inclined surface 30b, it (i.e., the oil) will run along in the direction in which the inclined surface 30b is inclined, and fall onto the cylinder block 4 from the oil passage 3d. That is, the amount of oil that falls onto the cylinder block 4 from the oil passage 3d will be greater than the amount of oil that falls onto the cylinder block 4 from the oil passage 3c. As a result, the heat exchange time from the oil on the inclined surface 30b of the cylinder head 3 is able to be increased, so the oil temperature is able to be reduced.

Figure 4:
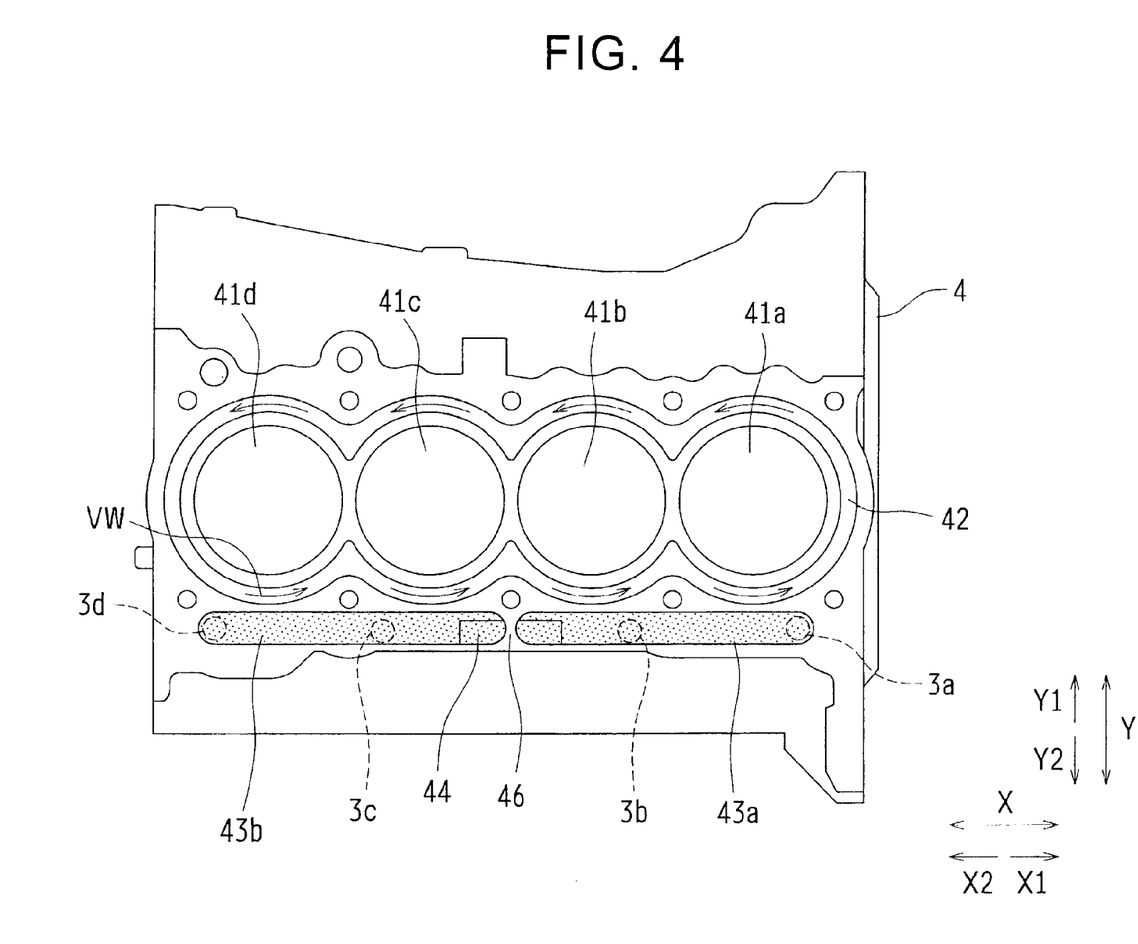
FIG. 4 is a plan view of a cylinder block viewed from above, according to the invention.

Next, the structure of the cylinder block 4 will be described. As shown in FIG. 4, the cylinder block 4 includes the four cylinders 41a to 41d, a block-side water jacket 42, and a first oil chamber 43a and a second oil chamber 43b.

Each of the cylinders 41a to 41d is formed in a generally cylindrical shape, with the piston 11 (see FIG. 1) slidably housed therein, and a combustion chamber, not shown, is formed in an upper end portion of each cylinder 41a to 41d. The combustion chamber is formed by a top surface of the piston 11, an inner peripheral surface of the cylinder 41a to 41d, and a portion of a lower surface of the cylinder head 3.

The block-side water jacket 42 cools a wall surface of the cylinders 41a to 41d with coolant, and is formed along an outer periphery of the cylinders 41a to 41d. Also, an inlet and an outlet, neither of which are shown, are formed in the block-side water jacket 42.

The inlet of the block-side water jacket 42 is configured such that coolant is able to be supplied from a water pump, not shown. The coolant that flows in from the inlet flows sequentially in the direction of arrow VW along the outer periphery of the cylinders 41a to 41d, and is discharged from the outlet formed on the outer periphery of the cylinders 41a to 41d. The coolant that has been discharged from the outlet is able to be delivered to a radiator, not shown, and heat recovered by the coolant is then released into the atmosphere at the radiator.

The first oil chamber 43a and the second oil chamber 43b are passages through which oil that has dripped down from the oil passages 3a to 3d of the cylinder head 3 drips down to the oil pan 5 (see FIG. 1) arranged below the cylinder block 4. A lower oil passage 45 is connected via a converging portion 44, which will be described later, to below the first oil chamber 43a and the second oil chamber 43b.

The first oil chamber 43a and the second oil chamber 43b both serve as oil passages through which oil that drips down from inside the oil passages 3a to 3d drips down near the position of a lower end of the block-side water jacket 42. As a result, the oil inside the first oil chamber 43a and the second oil chamber 43b is able to efficiently undergo heat exchange with the coolant inside the block-side water jacket 42, so the oil can be sufficiently cooled inside the first oil chamber 43a and the second oil chamber 43b.

The first oil chamber 43a and the second oil chamber 43b both extend in the cylinder arrangement direction (direction X) along the block-side water jacket 42. Also, the first oil chamber 43a and the second oil chamber 43b are both formed in long planar shapes in a vertical direction (direction Z; see FIG. 5) compared to a width direction (direction Y).

As shown in FIGS. 4 and 5, a partition wall portion 46 that divides the first oil chamber 43a from the second oil chamber 43b is formed near a center portion of the first oil chamber 43a and the second oil chamber 43b in the cylinder arrangement direction (direction X). Also, the first oil chamber 43a and the second oil chamber 43b have generally line-symmetrical shapes with respect to the partition wall portion 46.

The first oil chamber 43a and the second oil chamber 43b are each formed such that the width of the oil chambers becomes narrower in the direction in which oil flows (i.e., downward). That is, the first oil chamber 43a and the second oil chamber 43b each have a tapered shape that tapers in the direction in which the oil drips down (i.e., downward).

Next, the structure of the oil passage will be described. As shown in FIG. 5, the oil that has lubricated the lubricated portions drips down onto the upper surface 30 (i.e., the inclined surface 30a and the inclined surface 30b) of the cylinder head 3. The oil that has dripped down onto the inclined surface 30a first flows toward the outside (i.e., the side in the direction of arrow X1) along the inclined surface 30a, and then drips down from the oil passage 3a into the first oil chamber 43a of the cylinder block 4.

The oil that has dripped down into the first oil chamber 43a flows downward along a bottom surface 431a of the 43a. At this time, the temperature of the oil decreases as a result of heat exchange with the cylinder block 4. Then, the oil that has dripped down from the oil passage 3a flows to the converging portion 44 between the first oil chamber 43a and the second oil chamber 43b, while converging with the oil that drips down from the oil passage 3b.

Further, the oil that has dripped down onto the inclined surface 30b flows toward the outside (i.e., the side in the direction of arrow X2) along the inclined surface 30b, and then drips down from the oil passage 3d into the second oil chamber 43b of the cylinder block 4. The oil that has dripped down into the second oil chamber 43b flows downward along a bottom surface 431b of the second oil chamber 43b. At this time, the temperature of the oil decreases as a result of heat exchange with the cylinder block 4. Then, the oil that has dripped down from the oil passage 3d flows to the converging portion 44 between the first oil chamber 43a and the second oil chamber 43b, while converging with the oil that drips down from the oil passage 3c.

The oil that has converged at the converging portion 44 then drips down to the oil pan 5 via the lower oil passage 45 that extends in a vertical direction (direction Z) formed below the converging portion 44.

As described above, the cylinder head 3 according to this example embodiment is able to yield the effects described below.

In the example embodiment, the inclined surface 30a (30b) that is inclined from one oil passage 3b (3c), of the pair of oil passages 3a and 3b (3c and 3d), toward the other oil passage 3a (3d) is provided on the upper surface 30 of the cylinder head 3, which is positioned between the pair of oil passages 3a and 3b (3c and 3d), as described above. Therefore, oil that has dripped down onto the inclined surface 30a (30b) of the cylinder head 3 runs down from the one oil passage 3b (3c) toward the other oil passage 3a (3d) along this inclined surface 30a (30b), so the period of time (time) during which the engine oil contacts the inclined surface 30a (30b) of the cylinder head 3 is able to be longer than it is when the upper surface 30 of the cylinder head 3 is not inclined. As a result, the temperature of the engine oil is able to be reduced by an amount corresponding to the increase in the period of time (time) during which the engine oil contacts the inclined surface 30a (30b) of the cylinder head 3.

Also, in this example embodiment, the inclined surface 30a (30b) of the cylinder head 3, which is positioned between the pair of oil passages 3a and 3b (3c and 3d), is inclined such that the oil flows from the oil passage 3b (3c) that is positioned on the inside, toward the oil passage 3a (3d) that is positioned on the outside, as described above. Therefore, the period of time (time) during which the engine oil contacts the inclined surface 30a (30b) of the cylinder head 3 is longer, so more oil is able to flow through the oil passage 3a (3d) positioned on the outside that also tends to be cooled by outside air, while the temperature of the engine oil is reduced.

Also, in this example embodiment, of the pair of oil passages 3a and 3b (3c and 3d), the depth of the oil passage 3a (3d) positioned on the outside in the cylinder arrangement direction is less than the depth of the oil passage 3b (3c) positioned on the inside in the cylinder arrangement direction, as described above. Therefore, because the depth is less, the oil that flows into the oil passage 3a (3d) positioned on the outside flows down that much more easily compared with the oil passage 3b (3c) positioned on the inside, so the oil is able to flow smoothly.

Also, in this example embodiment, the inclined surface 30a (30b) of the cylinder head 3 is inclined in the axial direction (direction Z) of the oil passages 3a to 3d. Therefore, the oil that drips down in the axial direction of the pair of oil passages 3a and 3b (3c and 3d) is able to flow more easily toward the oil passage 3a (3d) along the inclined surface 30a (30b) of the cylinder head 3.

Also, in this example embodiment, the head-side water jacket 37 is not provided above the exhaust port 32a (32d) on the outside in the cylinder arrangement direction, as described above. When the head-side water jacket 37 is provided above the exhaust port 32a (32d), the temperature difference increases by an amount corresponding to the amount by which the surface area of the exhaust port 32a (32d) on the outside is larger than the surface area of the exhaust port 32b (32c) on the inside, because the temperature of exhaust gas that flows through the exhaust port 32a (32d) on the outside tends to be lower than the temperature of exhaust gas that flows through the exhaust port 32b (32d) provided on the outside. In contrast, with this example embodiment, the head-side water jacket 37 is not provided above the exhaust port 32a (32d) that is provided on the outside, so the temperature difference between the temperature of exhaust gas that flows through the exhaust port 32a (32d) on the outside and temperature of exhaust gas that flows through the exhaust port 32b (32c) on the inside is able to be reduced.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

For example, in the example embodiment described above, an example is described in which the cylinder head according to the invention is applied to an in-line four cylinder engine, but the invention is not limited to this. That is, the invention may also be applied to an engine having a number of cylinders other than four in-line cylinders.

Also, in the example embodiment described above, an example is described in which the inclined surface that is inclined from inside to outside is provided on the upper surface of the cylinder head, but the invention is not limited to this. For example, the inclined surface may also be inclined from outside to inside.

Also, in the example embodiment described above, an example is described in which the inclined surface of the cylinder is formed linearly, but the invention is not limited to this. For example, the inclined surface of the cylinder head may also be formed by a curved shape or the like.

The invention may be used for a cylinder head, and more particularly, for a cylinder head configured such that outlets of exhaust ports corresponding to a plurality of cylinders converge inside the cylinder head.

The invention claimed is:

1. A cylinder head comprising:

a plurality of exhaust ports provided corresponding to a plurality of cylinders, the plurality of exhaust ports being adjacent one another in a cylinder arrangement direction, the plurality of exhaust ports being configured to converge outlets of the exhaust ports inside the cylinder head, an outside one of the exhaust ports above which a water jacket is not provided and an adjacent inside one of the exhaust ports above which the water jacket is provided; and a pair of oil passages arranged so as to sandwich the outside one of the exhaust ports above which the water jacket is not provided, wherein an inclined surface provided on an upper surface of the cylinder head, the inclined surface being positioned between the pair of oil passages, and the inclined surface being inclined in the cylinder arrangement direction from one oil passage, of the pair of oil passages, toward the oil passage of the pair of oil passages.

2. The cylinder head according to claim 1, wherein one oil passage, of the pair of oil passages, is positioned on an inside, in the cylinder arrangement direction, of the cylinder head;

the other oil passage, of the pair of oil passages, is positioned on an outside in the cylinder arrangement direction; and the inclined surface of the cylinder head is positioned between the pair of oil passages, and is inclined such that oil flows from the oil passage positioned on the inside toward the oil passage positioned on the outside.

3. The cylinder head according to claim 1, wherein one oil passage, of the pair of oil passages, is positioned on an inside, in a cylinder arrangement direction, of the cylinder head;

the other oil passage, of the pair of oil passages, is positioned on an outside in the cylinder arrangement direction; and the inclined surface of the cylinder head is positioned between the pair of oil passages, the inclined surface corresponding tot the oil passage positioned on the inside is in a position higher than a position of the inclined surface corresponding to the oil passage positioned on the outside.

4. The cylinder head according to claim 2, wherein a length of the oil passage, of the pair of oil passages, positioned on the outside in the cylinder arrangement direction is shorter than a length of the oil passage positioned on the inside in the cylinder arrangement direction.

5. The cylinder head according to claim 1, wherein the inclined surface of the cylinder head is positioned between the pair of oil passages and the inclined surface is inclined relative to an axial direction of the oil passages.

6. The cylinder head according claim 1, wherein of the exhaust ports corresponding to the plurality of cylinders, a length of the exhaust port provided on an outside in a cylinder arrangement direction is made longer than a length of the exhaust port provided on an inside in the cylinder arrangement direction.

* * * * *